United States Patent [19]
Kajimoto et al.

[11] Patent Number: 5,559,641
[45] Date of Patent: Sep. 24, 1996

[54] VIDEO EDITING SYSTEM WITH AUTO CHANNEL ALLOCATION

[75] Inventors: Kazuo Kajimoto, Neyagawa; Kinya Kanno, Katano; Tetsuyuki Nakayasu, Moriguchi, all of Japan

[73] Assignee: Matsushita Electric Industrial Co., Ltd., Osaka, Japan

[21] Appl. No.: 132,790

[22] Filed: Oct. 7, 1993

[30] Foreign Application Priority Data

Oct. 9, 1992 [JP] Japan .................. 4-271339

[51] Int. Cl.⁶ .................................. G11B 27/02
[52] U.S. Cl. .................. 360/14.1; 369/83; 358/335; 348/578
[58] Field of Search .................. 360/14.1, 33.1, 360/13; 358/296, 335; 348/578, 558; 369/83

[56] References Cited

U.S. PATENT DOCUMENTS

| | | | |
|---|---|---|---|
| 4,538,188 | 8/1985 | Barker et al. | 360/14.3 |
| 4,724,491 | 2/1988 | Lambert | 358/310 |
| 4,746,994 | 5/1988 | Ettlinger | 360/13 |
| 4,797,836 | 1/1989 | Witek et al. | 364/518 |
| 4,979,050 | 12/1990 | Westland et al. | 360/14.1 |
| 5,051,845 | 9/1991 | Gardner et al. | 360/14.1 |
| 5,051,927 | 9/1991 | Tada et al. | 364/521 |
| 5,101,364 | 3/1992 | Davenport et al. | 360/14.1 |
| 5,182,677 | 1/1993 | Kizu et al. | 360/14.2 |
| 5,199,102 | 3/1993 | Sakuragi | 395/139 |
| 5,208,676 | 5/1993 | Inui | 358/296 |
| 5,227,863 | 7/1993 | Bilbrey et al. | 358/22 |
| 5,253,065 | 10/1993 | Richards et al. | 348/588 X |
| 5,347,622 | 9/1994 | Takemoto et al. | 348/590 X |

FOREIGN PATENT DOCUMENTS

| | | |
|---|---|---|
| 240794 | 10/1987 | European Pat. Off. . |
| 438299 | 7/1991 | European Pat. Off. . |
| 476985 | 3/1992 | European Pat. Off. . |

OTHER PUBLICATIONS

Patent Abstract of Japan, vol. 16, No. 373, Apr. 17, 1992, Yasuhiro et al. Moving Image Editing Device.
Patent Abstract of Japan vol. 14, No. 422 Jun. 22, 1990 Kaoru et al. Picture Editing Device and Picture Editing Testing Method.

*Primary Examiner*—Andrew L. Sniezek
*Attorney, Agent, or Firm*—Price, Gess & Ubell

[57] ABSTRACT

The present invention provides a useful video editing system capable of reading shot directly from an original source and preparing a master tape to which vide effects such as wipes are applied and a method thereof. The video editing system comprises a video storage device for storing video data which is composed of an array of a number of frames and which can be concurrently reproduced through two channels or more, a shot information storage device for storing shot information which designates the storage location of each shot to be reproduced in the video storage device, a shot link information output device for releasing shot link information as output which specifies a link order and a link method for the shots to be reproduced, a channel allocation determining device for determining, in accordance with the shot link information, to which of the channels each shot to be reproduced should be allocated and releasing it as channel allocation information, a shot reproduction control device for accessing the video storage device to read the shots to be reproduced from the determined channels in the determined order in accordance with the shot information, the shot link information and the channel allocation information, and an effects generator device for linking the plurality of shots of the plurality of channels, which are sent from the shot reproduction control device, in the determined link method and creating video effects to be applied to the linked shots.

6 Claims, 12 Drawing Sheets

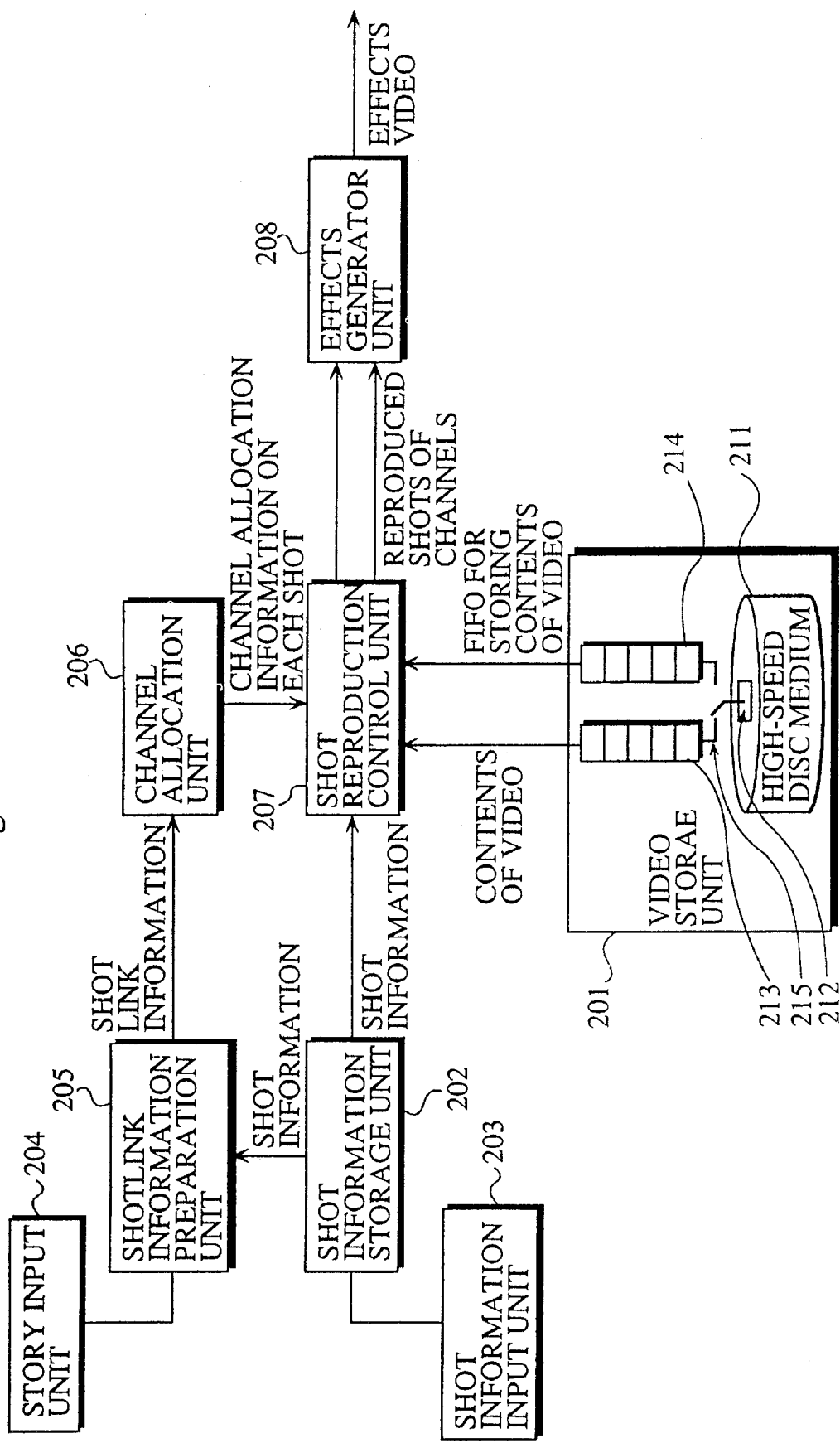

Fig.7

| SHOT NO. | START FRAME NO. | TERMINATION FRAME NO. |
|---|---|---|
| SHOT 1 | 100 | 350 |
| SHOT 2 | 6500 | 6730 |
| SHOT 3 | 900. | 1160 |
| SHOT 4 | 7500 | 7700 |

SHOTS 2 AND 3 ARE ONCE CONNECTED BY SCENE LINK

SHOT 5 IS INSERTED

DESIRED TRANSITIONS ARE SET BY USER FOR THE JOINTS BETWEEN SHOTS 2 AND 5 AND BETWEEN SHOTS 5 AND 3

EXAMPLE OF SHOT INSERTING OPERATION IN SHOT LINK INFORMATION PREPARATION UNIT

VIDEO EDITING SYSTEM WITH AUTO CHANNEL ALLOCATION

BACKGROUND OF THE INVENTION (1) Field of the Invention

The present invention relates to a system and method for video editing in which a video is divided into shots and after video effects such as wipes have been applied, the shots are rearranged.

(2) Description of the Related Arts

In a known video editing system, editing is performed, for example, in such a way that desired shots are selected from an original source (that is, one roll of video tape including pictures taken by a video camera etc.) and dubbed in a master tape.

In such a case, by the use of a transitional television and film technique such as wipes or dissolves, a video effect is achieved in a joint between one shot and another on the master tape. "Wipes" mentioned herein are transitional techniques in which: when two shots A and B continue in time, the transition therebetween is arranged such that the preceding shot A is partly broken away and the following shot B is projected in the broken-away part. The preceding shot A fades out as the following shot B fades in so that the former is gradually replaced by the latter.

"Dissolves" are such transitional techniques that the picture elements of the preceding shot A and those of the following shot B in the same locations are combined at a specified rate, thereby composing the picture elements in the above locations. The rate changes as time elapses so that the shot A is gradually replaced by the image of the shot B.

In order to perform shot transition with a passage of time such as wipes or dissolves, the shot A and the shot B need to be reproduced on different channels while they are being recorded on the master tape.

Therefore, there has been conventionally used such a technique that the shot A and the shot B are recorded on a roll tape for channel A and a roll tape for channel B respectively, after being taken from an original source and these shots are reproduced from the respective roll tapes with a predetermined timing.

With reference to FIG. 1, the structure of a prior video editing system will be hereinafter described. In FIG. 1, if Reference numeral 11 denotes an effects generator unit comprised of two channels A and B, for applying a video effect such as a wipe to video data entered in each input channel and then releasing the video data as output. The output of the effects generator unit 11 is recorded on a master tape. Reference numeral 12 denotes a video storage unit for a channel A which corresponds to the aforementioned A-channel roll tape. Reference numeral 13 is a shot information storage unit for the channel A. Shot information consists of frame Nos. which designate the start and termination of a shot stored in the A-channel video storage unit 12. Reference numeral 14 is a B-channel video storage unit which corresponds to the aforementioned B-channel roll tape.

Reference numeral 15 denotes a B-channel shot information storage unit which has the substantially same structure as the A-channel shot information storage 13, and in which shot information from the channel B is stored. Reference numeral 16 denotes a channel allocation unit which includes information on the reproducing order of shots from the channel A and the channel B and information on the width of each transition (i.e., the number of frames to be used for each transition). This channel allocation unit 16 receives shot information on each shot of each channel and prepares shot order information for the channel A and for the channel B respectively. The shot order information consists of frame Nos. on the master tape, by which the start and termination of reproduction of each shot from the channels A and B are indicated. Reference numeral 17 denotes an A-channel shot reproduction unit, and Reference numeral 18 denotes a B-channel shot reproduction unit. These units 17, 18 reproduce shots sent from the A-channel video storage unit 12 and the B-channel video storage unit 14 respectively at a timing which is determined in compliance with the respective shot order information (from the channel allocation unit 16) for the channel A and for the channel B, and then send the reproduced shots to the effects generator unit 11.

In the system having the above arrangement, the editor must preliminarily perform the following steps before editing can be automatically performed. Specifically, the user must (1) select particular shots to be taken out of the original source and (2) determine which storage unit 12 video storage unit 14 (12 or 14) will be used for storing each particular shot. Video data in the two video storage units 12, 14 are then reproduced in an order predetermined by the channel allocation unit 16, and the effects generator unit 11 creates wipes to the video data.

Here, suppose that the shots shown in FIG. 2 are linked using the above video editing system. FIG. 2 shows the case in which Shot A is firstly reproduced and Shot B is then reproduced being linked to Shot A by a wipe, and thereafter, Shots C and D are reproduced in this order being linked by a wipe.

According to step (2) above, the user must decide whether a selected shot is allocated to the channel A or the channel B. In the case shown in FIG. 2, since each shot is linked by a wipe, if Shot A is allocated to the channel A, Shot B, Shot C, Shot D will be allocated to the channel B, the channel A and the channel B respectively.

After this step (2), the user must determine whether the contents of each shot are stored in the proper video storage units 12, 14 (which corresponds to the channel to which the shot has been allocated). For example, if the contents of Shot C are not stored in the A-channel video storage unit 12 but stored in the B-channel video storage unit 14, the contents must be copied from the video storage unit 14 to the video storage unit 12 prior to starting of editing.

It is not until the completion of the above-described preparation that the channel allocation unit 16 prepares a link order as shown in FIG. 3, in which the shots are arranged in order in relation to the channels A and B. The link order is then released to the shot reproduction units 17, 18 to obtain a desired result.

The prior video editing system, however, has the disadvantage that since the user has to allocate, prior to starting of actual editing operation, each shot to be taken from the original source to the A-channel video storage unit 12 or the B-channel video storage unit 14 according to an editing plan imaged by the user, the operation for copying shots of the original source into the video storage units 12, 14 is required and, furthermore, it is very difficult to change the allocation once shots are allocated.

For example, such necessity often arises after completion of allocation that the link order of shots is altered by relocating shots after seeing an editing result or new shots are inserted into existing shot sequence. In such cases, the following troublesome operations become necessary: A shot to be relocated is copied from either one of the video storage units 12, 14 into the other while rewriting the corresponding information stored in the shot information storage unit 13 or 15; or all the shots located after an insert position are relocated between the video storage units 12, 14 while rewriting the corresponding information stored in the shot information storage units 13 and 15. The latter operation necessary in the case of newly inserting a shot in shot sequence especially requires enormous time and labor and therefore there has been a strong demand for a system and method capable of facilitating such insert edit.

SUMMARY OF THE INVENTION

It is therefore a prime object of the invention to provide a useful video editing system capable of reading shots directly from an original source and preparing a master tape to which video effects such as wipes are applied.

It is another object of the invention to provide an video editing system capable of altering the link order of shots and inserting new shots in existing shot sequence without difficulties.

The above objects and advantages of the invention are achieved by a video editing system comprising:

video storage means for storing video data which is composed of an array of a number of frames and which can be concurrently reproduced through two channels or more;

shot information storage means for storing shot information which designates the storage location of each shot to be reproduced in the video storage means;

shot link information output means for releasing shot link information as output which specifies a link order and a link method for the shots to be reproduced;

channel allocation determining means for determining, in accordance with the shot link information, to which of the channels each shot to be reproduced should be allocated and releasing it as channel allocation information;

shot reproduction control means for accessing the video storage means to read the shots to be reproduced from the determined channels in the determined order in accordance with the shot information, the shot link information and the channel allocation information; and effects generator means for linking the plurality of shots of the plurality of channels, which are sent from the shot reproduction control means, in the determined link method and creating video effects to be applied to the linked shots.

Preferably, the video storage means includes a high-speed disc medium having the ability of transferring video data at high speeds and FIFOs for storing the video data transferred from the high-speed disc medium, the number of FIFOs being the same as the number of channels.

Preferably, the channel allocation determining means comprises a first allocation unit for allocating a first shot in the shot link information to a first channel; and a second allocation unit for allocating a following shot to a channel different from a channel to which a preceding shot has been allocated, when the preceding and following shots are overlapped in terms of time at their joint.

It is also preferable that the shot reproduction control means comprises:

a first detection unit for detecting a shot to be reproduced from the shot link information;

a second detection unit for detecting the storage location of the detected shot in the high-speed disc medium from the shot information;

a transfer control unit for transferring the shot from the location in the high-speed disc medium detected by the second detection unit to one of the FIFOs for a channel to which the shot is allocated in the channel allocation information; and an output unit for reading the shot to be reproduced from the FIFO for the channel to which the shot has been allocated, in synchronization with the cycle of the frames, to release to the effects generator means.

Preferably, the video editing system further comprises a first input unit for entering data to be stored as the shot information in the shot information storage means; and a second input unit for entering data for specifying a link order and a link method for the shots to be reproduced, as the shot link information.

In the video editing system according to the invention, the channel allocation unit automatically allocates a channel to each shot according to an editing plan, and therefore it is no longer necessary for the user to carry out channel allocation by himself in accordance with a plan imagined by him prior to starting of an actual editing operation and to copy the contents of each shot into the video storage units according to the allocation. This markedly reduces the time required for the editing operation and facilitates modification of the allocation so that its profitability and utility are significantly great.

It is another object of the invention to provide a practical, rational video editing method.

The above object can be achieved by a video editing method comprising the steps of:

(1) entering shot information which designates the storage location of each shot to be reproduced in a recording medium for storing video data composed of an array of a number of frames;

(2) entering a link order and a link method for the shots to be reproduced;

(3) preparing shot link information based on the information which has been entered in the first and second steps;

(4) preparing channel allocation information by determining, in accordance with the shot link information, to which of a plurality of channels each shot to be reproduced should be allocated; and (5) reading each shot to be reproduced in the order determined by the shot link information from the location in the recording medium designated by the shot information, and transferring it to the corresponding channel designated by the channel allocation information in order to release to an effects generator unit.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 5 is a block diagram showing one example of the structure of the video editing system according to the invention;

FIG. 7 illustrates the contents of information stored in a shot information storage unit;

DESCRIPTION OF PREFERRED EMBODIMENTS (First Embodiment)

Figure 1:
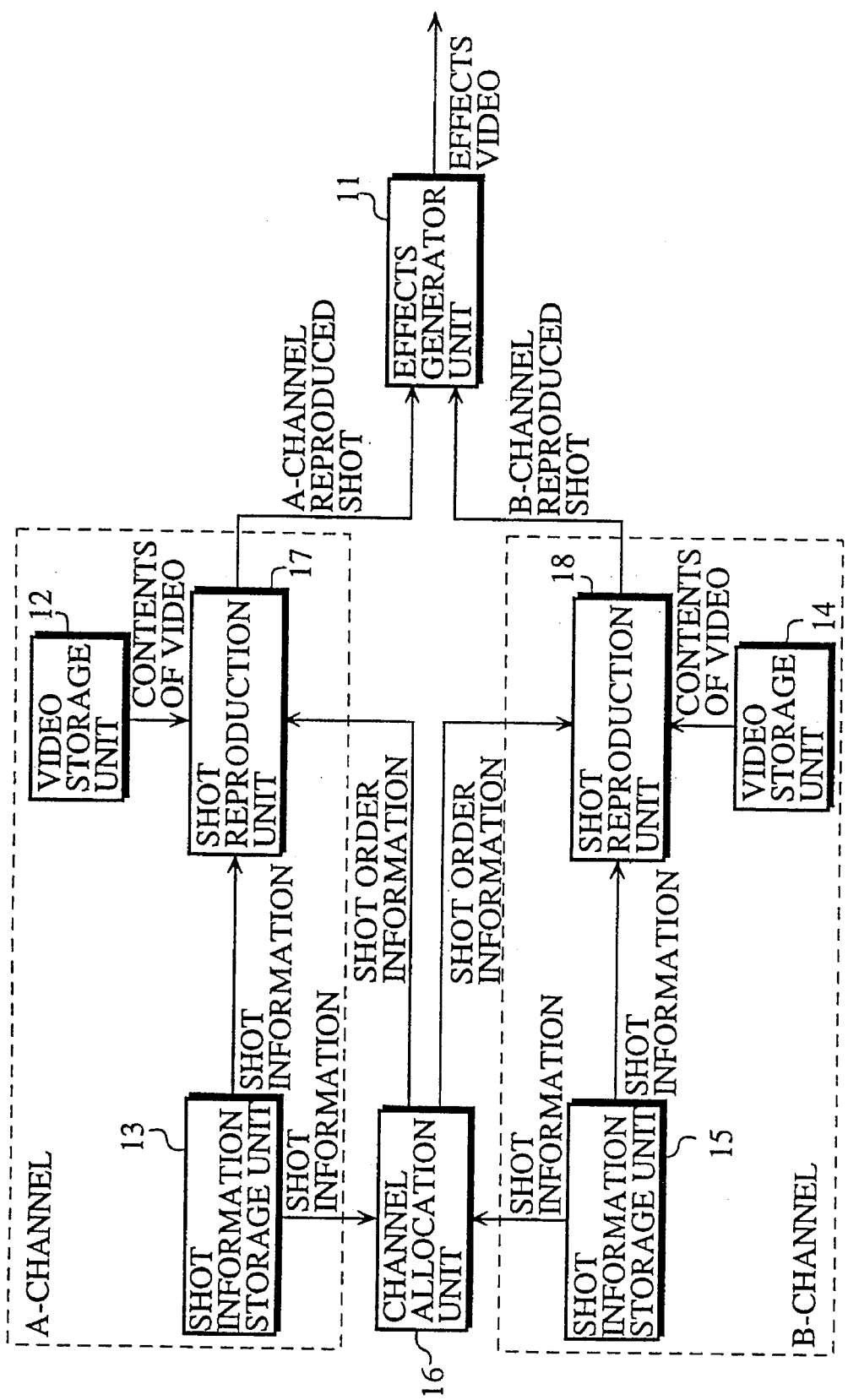
FIG. 1 is a block diagram showing the structure of a prior video editing system.
Figure 2:
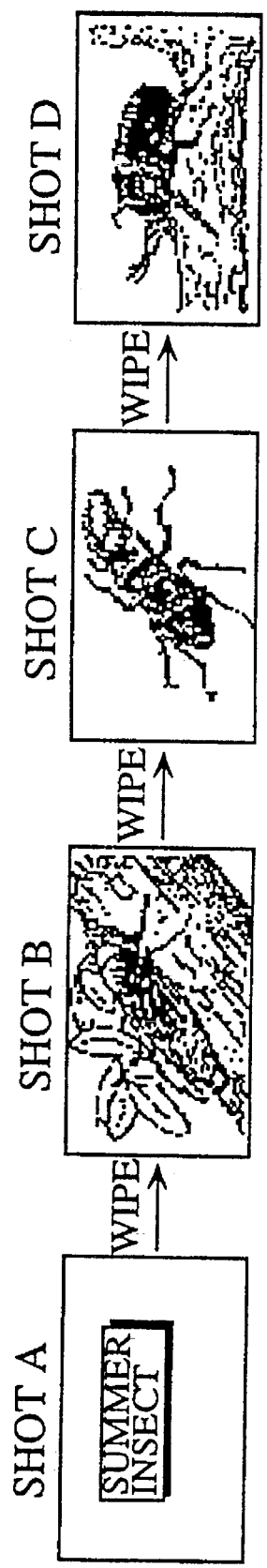
FIG. 2 illustrates an example of edited video.
Figure 3:
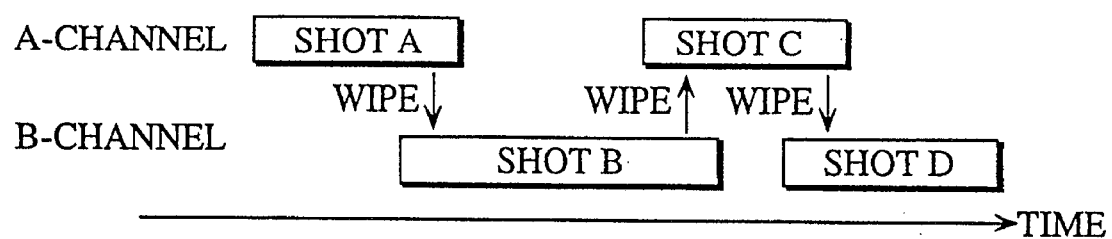
FIG. 3 is a view showing the channel allocation condition of shots.
Figure 4:
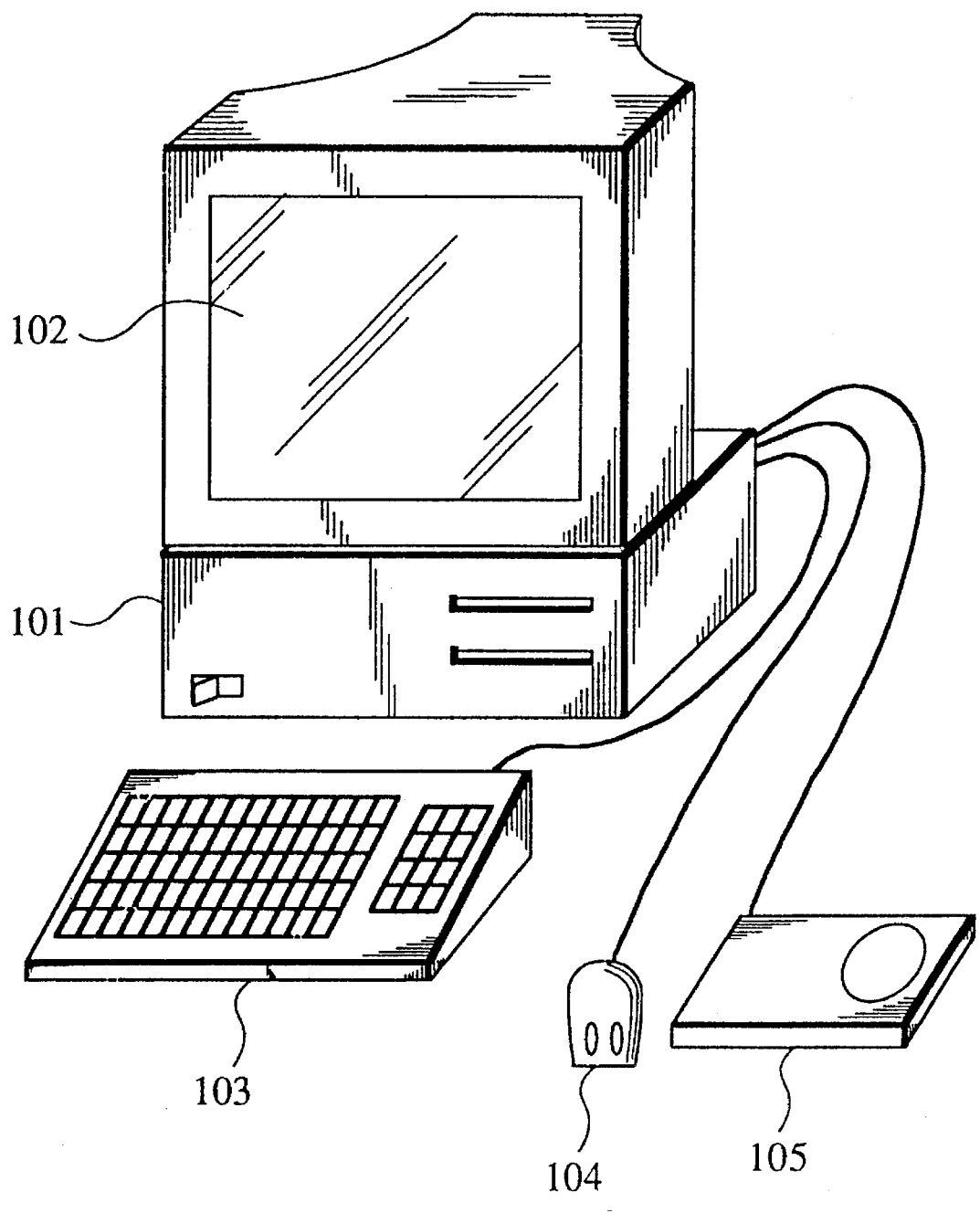
FIG. 4 is a view showing the external appearance of a video editing system according to the invention.

FIG. 4 shows the external appearance of a video editing system according to one embodiment of the invention. The video editing system is composed of a control unit body 101, a CRT 102, a key board 103, a mouse 104 and a jog dial 105 used for video operation.

FIG. 5 is a block diagram showing the structure of the video editing system that includes a video storage unit 201, a shot information storage unit 202, a shot information input unit 203, a story input unit 204, a shot link information preparation unit 205, a channel allocation unit 206, a shot reproduction control unit 207 and an effects generator unit 208. The video storage unit 201 comprises a high-speed disc medium 211 storing video data in a digital form, a readout unit 212 for reading out the video data at high speeds, and a switching unit 215 for allowing the read out data to be stored in an A-channel FIFO memory 213 or a B-channel FIFO memory 214 in accordance with instruction from the shot reproduction control unit 207. Reading the data from the FIFOs 213, 214 to transfer to the shot reproduction control unit 207 is executed by one frame in synchronization with the cycle of the frames and it is possible to simultaneously read data from these FIFOs and 214. The readout unit 212 can read out data in blocks so that the speed at which the readout unit 212 reads data from the high-speed disc medium 211 is satisfactorily higher than the speed at which the shot reproduction control unit 207 reads data from the FIFOs 213, 214. Note that the digitalized video data recorded on the high-speed disc medium 211 consists of a number of frames like a motion picture taken by a video camera and stored on one roll of video tape.

Figure 6A:
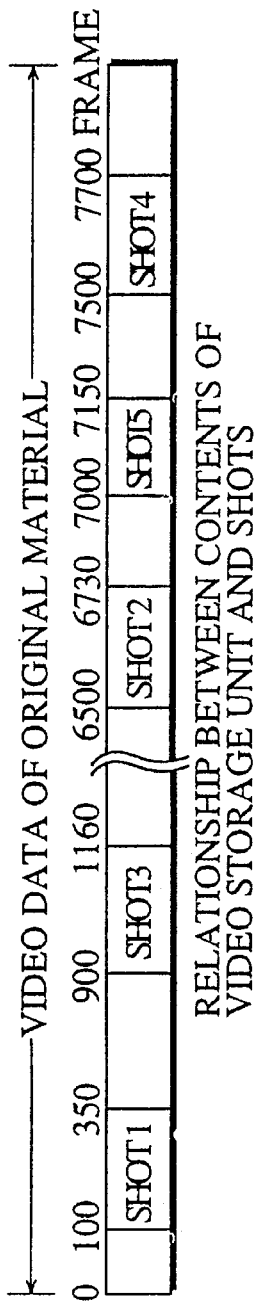
FIGS. 6A to 6C illustrate shot link information.

The shot information storage unit 202 stores, as shot information, a number assigned to each shot to be taken from an original source, the number of the frame on the original source where the shot starts and the number of the frame where the shot terminates. For example, when Shots 1 to 4 are taken from an original source M as shown in FIG. 6A, the shot information is as shown in FIG. 7. The shot information input unit 203 is used for entering, as input, the shot No., start frame No., termination frame No. to be stored in the shot information storage unit 202, and corresponds to the keyboard 103 shown in FIG. 4.

The story input unit 204 is for entering the link order of shots, the number of frames to be used for a joint between shots, and a video effect to be applied to a joint.

Figure 6B:
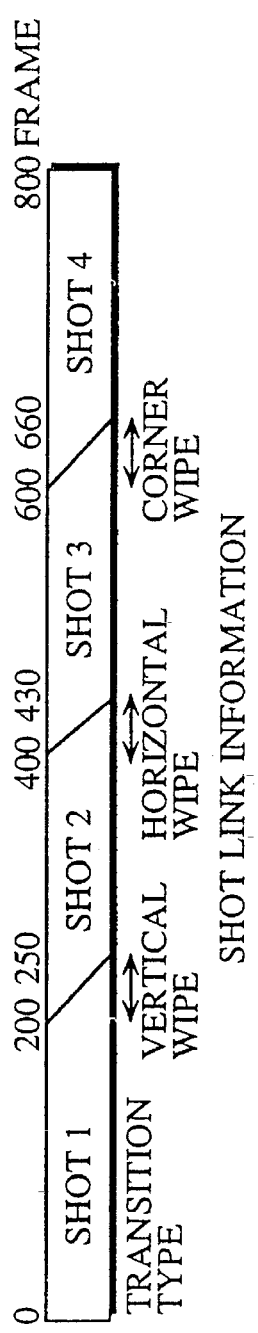

The shot link information preparation unit 205 prepares shot link information, based on input information entered by the story input unit 204 and the shot information read from the shot information storage unit 202. FIG. 6B shows an example of the shot link information, prepared from input information from the story input unit 204 and the shot information shown in FIG. 7. Note that the frame Nos. in FIG. 6B are those on the master tape M.

Figure 8:
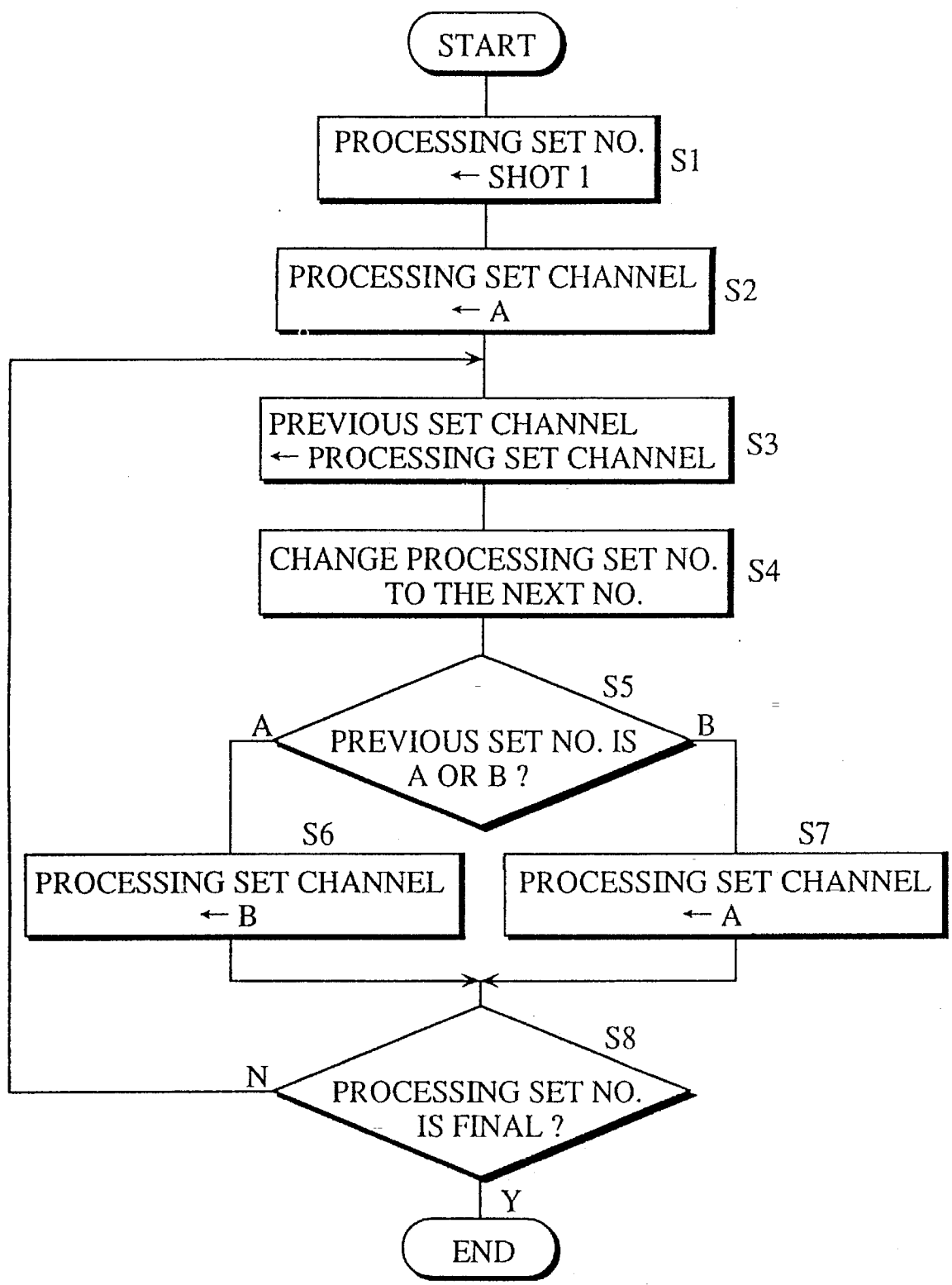
FIG. 8 is a flow chart of an operation of a channel allocation unit.

The channel allocation unit 206 allocates each shot to a channel A or a channel B in accordance with the shot link information and this allocating operation is executed in accordance with the flow chart of FIG. 8. The contents of a register for storing a processing set No. (the No. of a shot being processed) is set to Shot 1 (Step 1), and then the channel A is set as the processing channel for Shot 1 (Step 2). The previous channel A or B set just before is stored in a register for storing a previous set channel (Step 3) and then, the contents of the processing set No. register are changed to the following shot, i.e., Shot 2 (Step 4). The channel stored in the previous set channel register is checked (Step 5), and if the previous set channel is A, the channel B is set for the next shot 2 (Step 6). If the preceding set channel is B, the channel A is set for the following shot 2 (Step 7). The above steps (Step 3 to Step 7) are repeated up to the last shot No. of the shot link information (Step 8) and thereafter, the channel allocation operation is completed.

Figure 9:
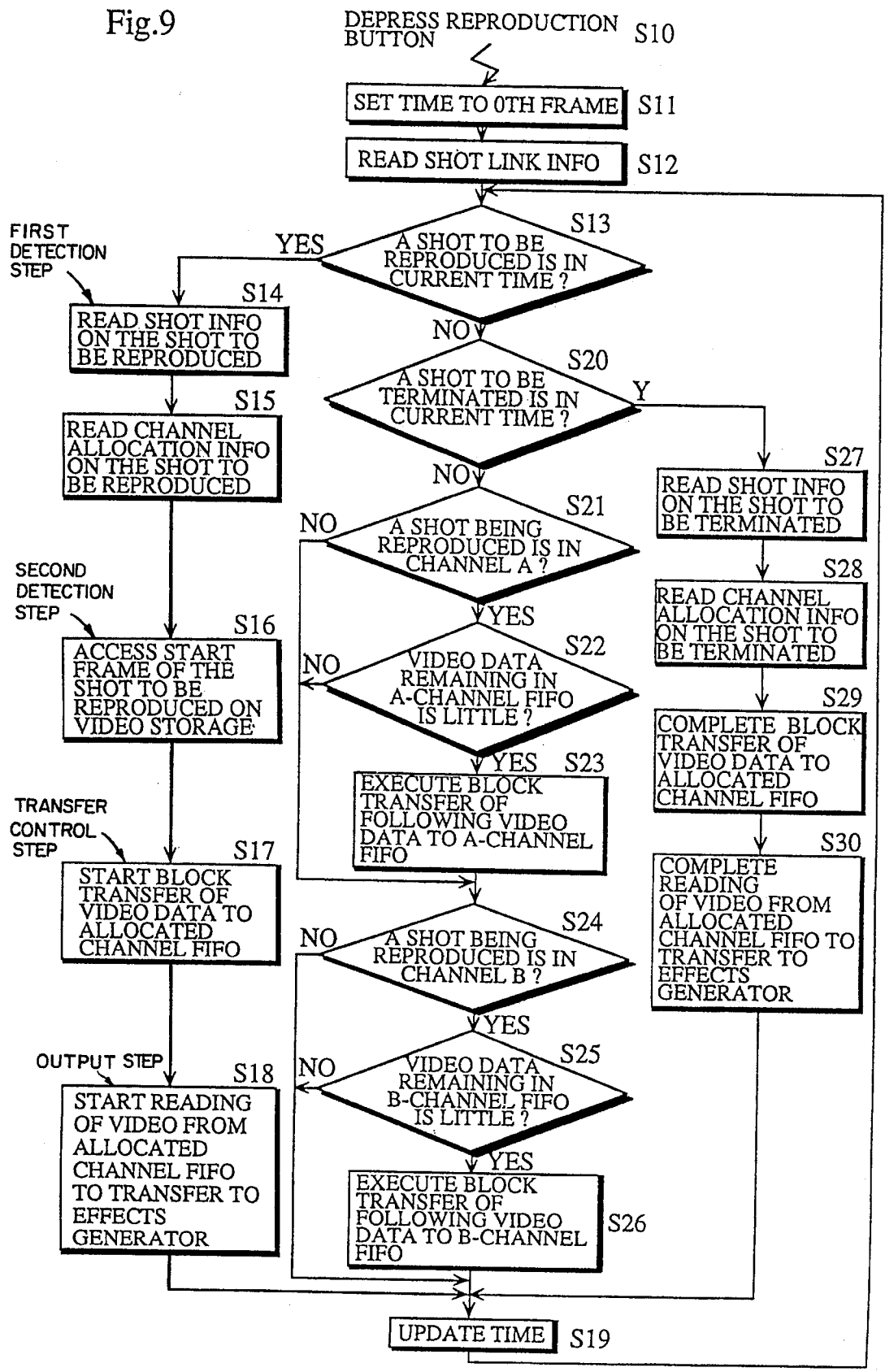
FIG. 9 is a flow chart of an operation of a shot reproduction control unit.

The shot reproduction control unit 207 controls the operation for reading video data from the video storage unit 201, in accordance with the channel allocation information for each shot that is sent from the channel allocation unit 206, the shot information from the shot information storage unit 202 and the shot link information from the shot link information preparation unit 205. This control operation is shown in FIG. 9. The operation is started by depression of a reproduction button operated by the operator (Step 10). Specifically, after the reproduction button has been depressed, time is set to a 0th frame (Step 11) and the shot link information is read (Step 12). Since the shot link information indicates as shown in FIG. 6B that Shot 1 is reproduced at the 0th frame, the program proceeds from Step 13 to Step 14 and Step 15, where the shot information and channel allocation information for Shot 1 are read. Thereafter, the starting frame of Shot 1 stored in the video storage unit 201 is specified (Step 16), and a block of video data is transferred from the starting frame to the A-channel FIFO 213 (Step 17). At the same time, the video data is read from the FIFO 213 to be transferred to the effects generator unit 208 (Step 18). Thereafter, time (frame No.) is updated (Step 19), and Step 13, Step 20, Step 21, Step 22, Step 23, Step 19 and Step 13 are executed in this order, thereby reading out Shot 1. According to the shot link information, when the current time reaches a 200th frame, readout of Shot 2 starts and therefore, the operation for reading data from the channel B is concurrently performed (Steps 14 to 18, Step 24, Step 25, Step 26).

When a 250th frame is reached, the readout of Shot 1 is completed, so that the program proceeds to Steps 27 to 30 and the readout from the A-channel FIFO is thus completed. On the other hand, the readout of Shot 2 alone from the B-channel FIFO 214 is continued up to a 400th frame.

According to the shot link information, readout of Shot 3 starts when the 400th frame is reached and, therefore, Shot 3 is transferred from the high-speed disc medium 211 to the A-channel FIFO 213 and at the same time, Shot 3 is read from the FIFO 213. Similarly, the following shots designated by the shot information are read and transferred in accordance with the shot link information to the respective channels to which those shots have been allocated in the channel allocation information.

In the following table, a series of operations in the shot reproduction control unit 207 are explained in the order of frame Nos.

TABLE 1

| Time (frame No.) | Event | Operation of shot reproduction control unit | Operation of effects generator unit |
|---|---|---|---|
| 0 | reproduction of Shot 1 starts | 100th frame in video storage is accessed block transfer of video data to A-channel FIFO starts reading of video data from A-channel FIFO to effects generator starts | channel A 100% |
| 200 | reproduction of Shot 2 starts | 6500th frame in video storage is accessed block transfer of video data to B-channel FIFO starts reading of video data from B-channel FIFO to transfer to effects generator starts | transition from channel A to channel B starts |
| 250 | reproduction of Shot 1 is completed | block transfer of video data to A-channel FIFO is completed reading of video data from A-channel FIFO to transfer to effects generator is completed | transition from channel A to channel B is completed (channel B 100% now) |
| 400 | reproduction of Shot 3 starts | 900th frame in video storage is accessed block transfer of video data to A-channel FIFO starts reading of video data from A-channel FIFO to transfer to effects generator starts | transition from channel B to channel A starts |
| 430 | reproduction of Shot 2 is completed | block transfer of video data to B-channel FIFO is completed reading of video data from B-channel FIFO to transfer to effects generator is completed | transition from channel B to channel A is completed (A-channel 100% now) |
| 600 | reproduction of Shot 4 starts | 7500th frame in video storage is accessed block transfer of video data to B-channel FIFO starts reading of video data from B-channel FIFO to transfer to effects generator starts | transition from channel A to channel B starts |
| 660 | reproduction of Shot 3 is completed | block transfer of video data to A-channel FIFO is completed reading of video data from A-channel FIFO to transfer to effects generator | transition from channel A to channel B is completed (B-channel 100% now) |

TABLE 1-continued

| Time (frame No.) | Event | Operation of shot reproduction control unit | Operation of effects generator unit |
|---|---|---|---|
| 800 | reproduction of Shot 4 is completed | is completed block transfer of video data to B-channel FIFO is completed reading of video data from B-channel FIFO to transfer to effects generator is completed | |

It should be noted that although the shot link information includes the condition of transition, information on the condition of transition is directly sent to the effects generator unit 208.

Figure 10:
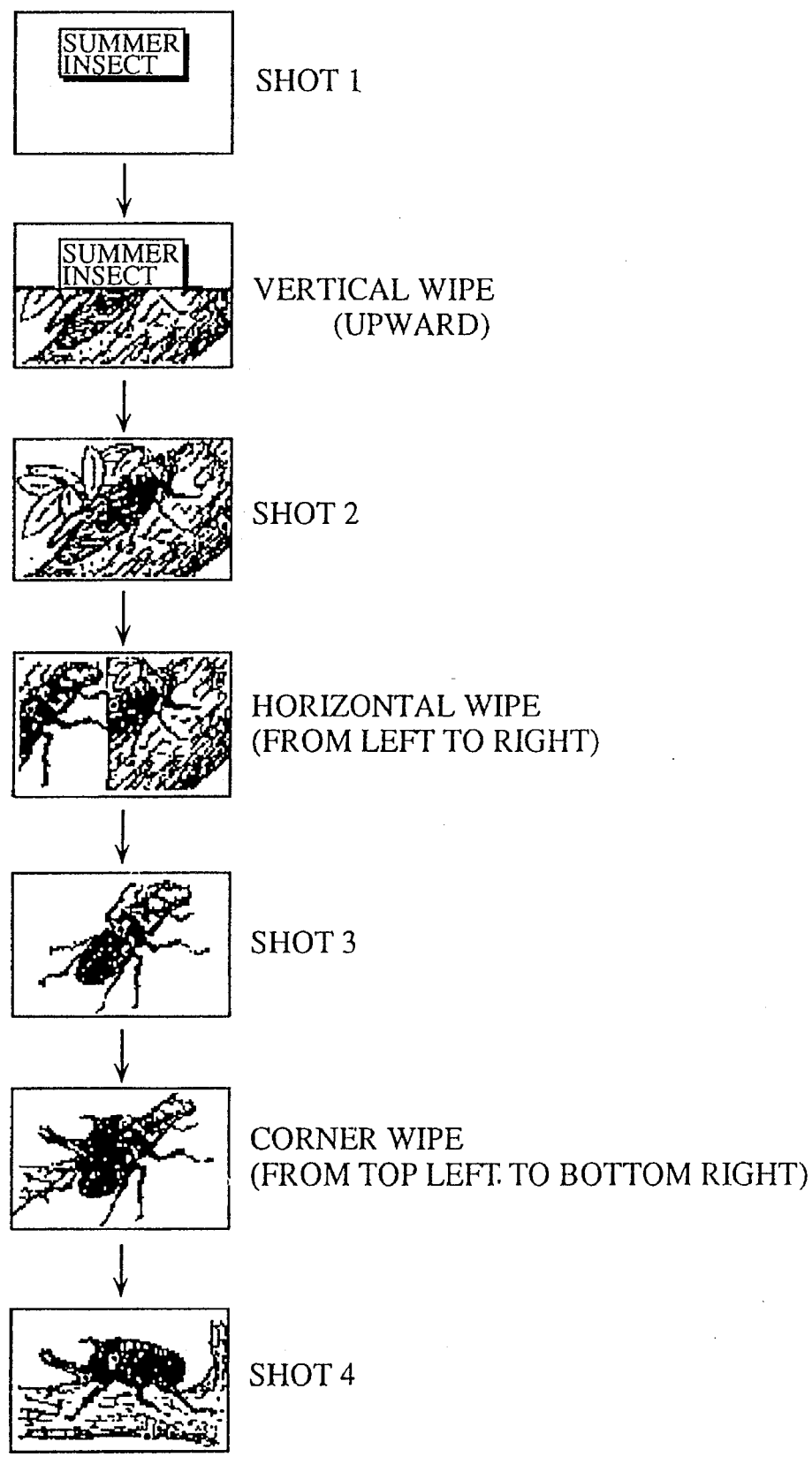
FIG. 10 illustrates edited video.
Figure 11A:
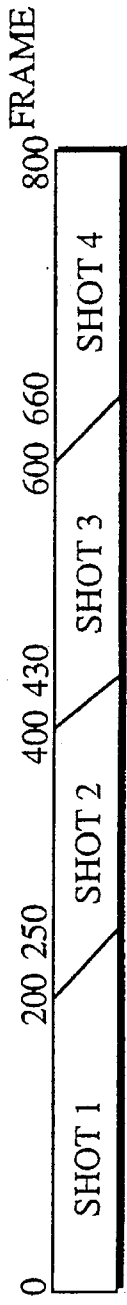
FIGS. 11A to 11D illustrate a process for inserting a new shot in existing shot sequence after completion of video editing.
Figure 11B:
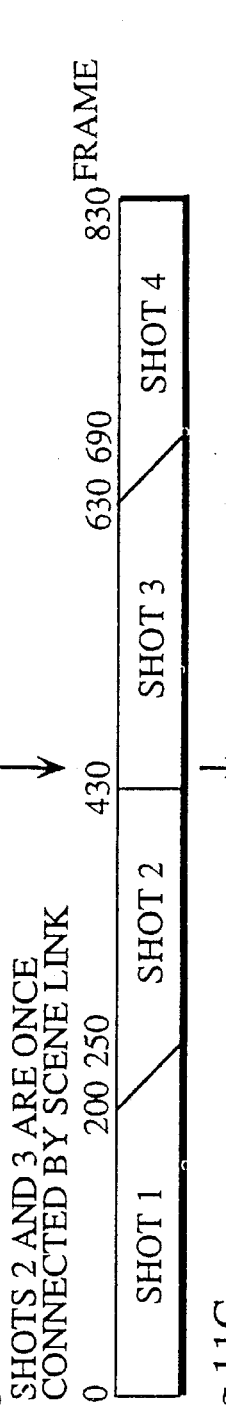
Figure 11C:
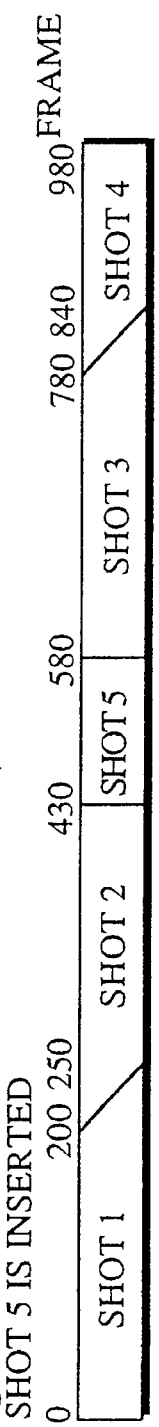
Figure 11D:
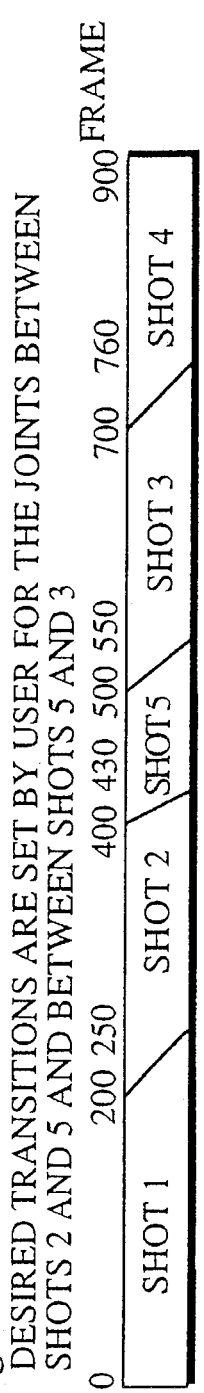

The effects generator unit 208 creates an effect according to the condition of transition to apply to the video of each shot sent from the shot reproduction control unit 207 and releases these shots to a master tape to be recorded thereon. FIG. 10 shows a series of videos obtained by applying effects such as wipes to video data released from the shot reproduction control unit 207 by means of the effects generator unit 208.

Figure 6C:
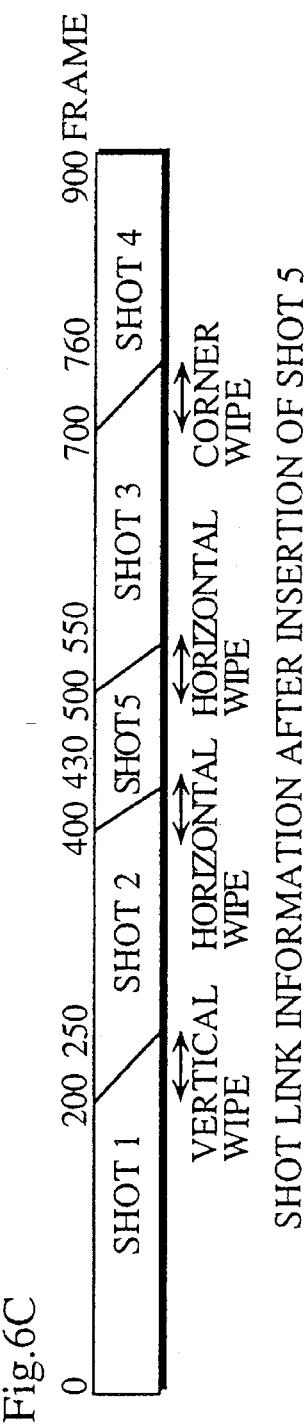

Suppose that, after completing editing of Shot 1 to 4 and preparing the shot link information as shown in FIG. 6B in the system having the above arrangement, there arises the necessity for inserting Shot 5, which exists in the region from 7,000th to 7,150th frames of the video data recorded on the original source M, between Shot 2 and Shot 3. In this case, the operator firstly enters the start and termination frame Nos. of Shot 5 in the video data of the original source through the shot information input unit 203 and enters the location in which Shot 5 is to be inserted through the story input unit 204. Thereafter, the shot link information preparation unit 205 reads a new piece of shot information from the shot information storage unit 202 and generates the shot link information as shown in FIG. 6C in which Shot 5 is inserted between Shot 2 and Shot S. Upon receipt of the shot link information, the channel allocation unit 206 executes the processing shown in the flow chart of FIG. 8, thereby allocating a channel to each shot again. In the above processing, Shot 5 is allocated to the channel A whilst the following shots (i.e., Shots 3 and 4) are respectively allocated to the channels opposite to the previous ones.

As has been described, the shot information, shot link information and channel allocation information can be automatically prepared simply by entering, as input, the frame Nos. of a new shot on the original source and the location to which the new shot is to be inserted, so that the edited videos in which Shot 5 is inserted between Shots 2 and 3 can be readily reproduced by depressing the reproduction button again.

It is to be noted that the shot link information preparation unit 205 actually executes a processing in the order shown in FIG. 11 in order to prepare the shot link information shown in FIG. 6C from the shot information and the information entered through the story input unit 204. Specifically, the position between Shots 2 and 3 to which Shot 5 is to be inserted is firstly altered to a "shot link" (see FIG. 11B) and Shot 5 is inserted into the "shot link" position as shown in FIG. 11C. Then, video effects specified by the users are respectively applied to the position between Shots 2 and 5 and the position between Shots 5 and 3 (see FIG. 11D).

(Second Embodiment)

Figure 12:
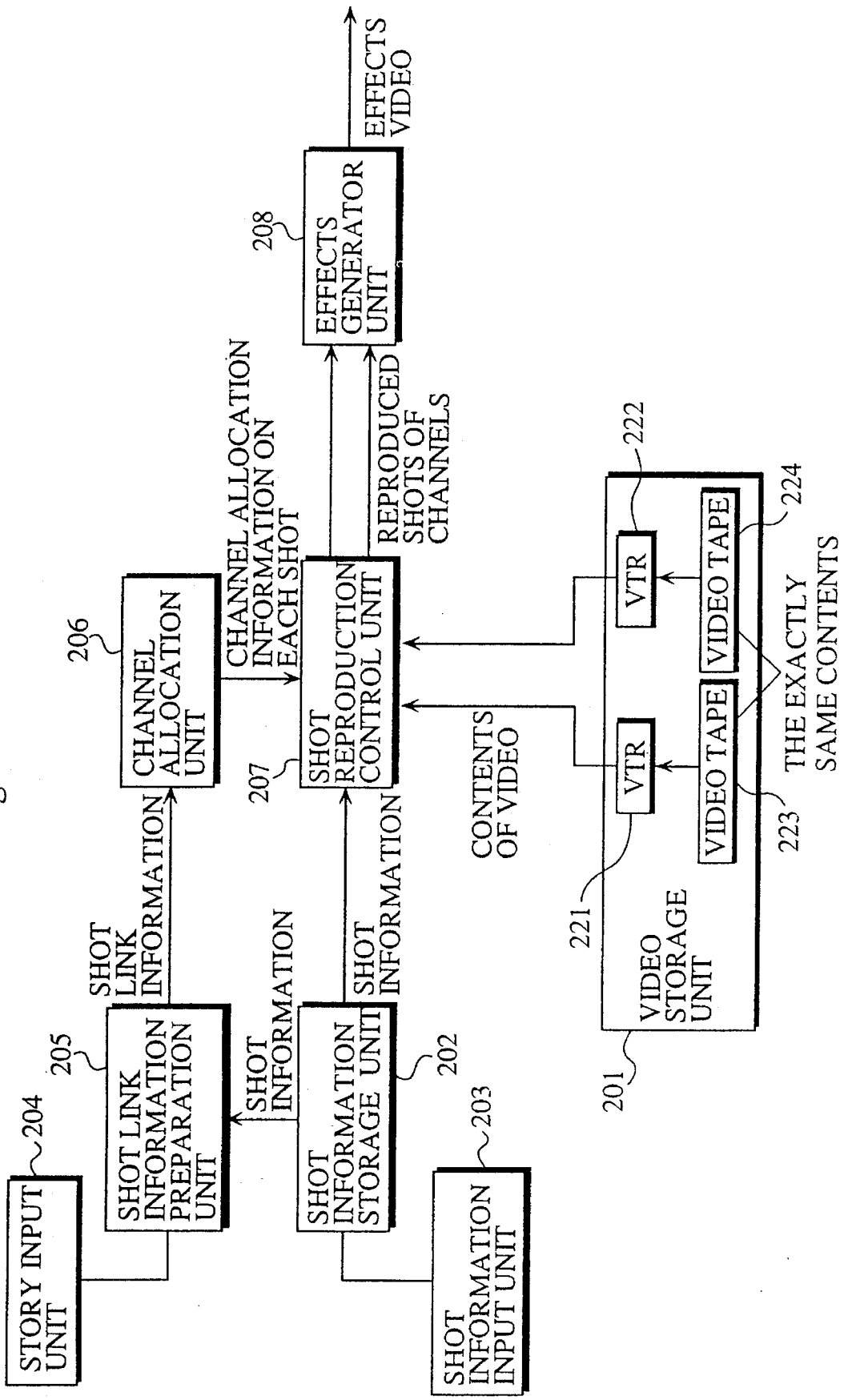
FIG. 12 is a block diagram of another embodiment of the invention.

FIG. 12 shows a second embodiment of the invention. In the second embodiment, the video storage unit 201 includes two VTRs 221, 222 in which tapes 223, 224 having the exactly same video data are adapted for reproduction. Since the video data of the channel A and the video data of the channel B are the same and are released at the same time from the video storage unit 201, the shot reproduction control unit 207 reads the video data of the two channels from the video storage unit 201 in accordance with the channel allocation information, shot information and shot link information to release to the effects generator unit 208. In consequence, the edited videos to be obtained after being subjected to the processing by the effects generator unit 208 will be exactly the same as those of the first embodiment. As other components than the video storage unit 201 in the second embodiment are basically substantially identical with those of the first embodiment, an explanation will be omitted. Although two VTRs are used in the second embodiment, it is also possible to employ other arrangements instead of VTRs only if they include a plurality of independently operative heads.

In the first embodiment, high-speed video reproduction is achieved using a high-speed disc medium in combination with FIFO memories for video data, but it could be also achieved in such a way that data is compressed and stored in the video storage unit and is reproduced by video expansion in the shot reproduction control unit.

The invention has been particularly described with the case in which wipes are created in the effects generator unit; however, it is not necessarily limited to such a case and the effect to be created could be other video effects such as dissolves or shot link.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

We claim:

1. An image editing apparatus, comprising:

image storage means, including a disk storing a source material and a plurality of FIFO memory units, which can reproduce images stored on the disk simultaneously on two or more channels;

shot information storage means for storing shot information which expresses every block of images to be reproduced as an area in the image storage means;

shot link information preparation means for preparing shot link information which defines a link order for the blocks of images to be reproduced and a link method, based on the shot information and on a shot link order and link method inputted by an operator;

channel allocation decision means for referring to the shot link information and deciding to which channel the blocks of images to be reproduced should be allocated;

shot reproduction control means for referring to the shot information, the shot link information and the channel allocation information, for accessing the image storage means, and for retrieving each of the blocks of images to be reproduced in a decided order from the decided channel, the shots being allocated to the channels as they are read from the image storage means; and effects execution means for linking a number of image blocks outputted by the shot reproduction control means on a number of channels according to the decided link method and for generating image effects.

2. A video editing system according to claim 1, wherein the channel allocation determining means comprises a first allocation unit for allocating a first shot in the shot link information to a first channel; and a second allocation unit for allocating a following shot to a channel different from a channel to which a preceding shot has been allocated, when the preceding and following shots are overlapped in terms of time at their joint.

3. A video editing system according to claim 2, wherein the shot reproduction control means comprises:

a first detection unit for detecting a shot to be reproduced from the shot link information;

a second detection unit for detecting the storage location of the detected shot in the high-speed disc medium from the shot information;

a transfer control unit for transferring the shot from the location in the high-speed disc medium detected by the second detection unit to one of the FIFO memory units for a channel to which the shot is allocated in the channel allocation information; and an output unit for reading the shot to be reproduced from the FIFO memory unit for the channel to which the shot has been allocated, in synchronization with the cycle of the frames, to release to the effects generator means.

4. A video editing system according to claim 3, further comprising:

a first input unit for entering data to be stored as the shot information in the shot information storage means; and a second input unit for entering data for specifying a link order and a link method for the shots to be reproduced, as the shot link information.

5. An image editing apparatus, comprising:

image storage means, including both a disk storing image sets and a switching unit for switching image sets read from the disk to any of a plurality of FIFO memory units, each of the plurality of FIFO memory units corresponding to an allocated channel, wherein the plurality of FIFO memory units can simultaneously output image sets on the allocated channels;

shot information storage means for storing shot information input by a user, the inputted shot information identifying each image set to be reproduced and expressing each identified image set as an area in the image storage area;

shot link information preparation means for preparing shot link information input by a user, the inputted shot link information including a shot link order and a shot link method and defining a link order for the image sets to be reproduced and a link method, the shot link information being prepared based on the inputted shot information and the inputted shot link information;

channel allocation decision means for referring to the shot link information and deciding to which channel the image sets to be reproduced should be allocated;

shot reproduction control means for performing the following:

(a) referring to the shot information, the shot link information, and the channel allocation information;

(b) accessing the image storage means;

(c) simultaneously reproducing image sets from the respective FIFO memory units, the image sets being reproduced on channels corresponding to the respective channels of the FIFO memory units; and (d) allocating each reproduced image set in the decided order from a FIFO memory unit corresponding to the decided channel; and effects execution means for linking a number of reproduced image sets outputted by the shot reproduction control means on a number of channels according to the inputted shot link method and for generating image effects.

6. An image editing apparatus, comprising:

image storage means, including a disk storing a source material and a switching unit for switching source material read from the disk to any of a plurality of FIFO memory units, each of the plurality of FIFO memory units storing source material corresponding to an allocated channel, wherein the plurality of FIFO memory units can simultaneously reproduce blocks of images on the allocated channels, the blocks of images being reproduced from source materials on corresponding allocated channels;

shot information storage means for storing shot information input by a user, the inputted shot information identifying each block of images to be reproduced and expressing each identified block of images as an area in the image storage area;

shot link information preparation means for preparing shot link information input by a user, the inputted shot link information including a shot link order and a shot link method and defining a link order for the blocks of images to be reproduced and a link method, the shot link information being prepared based on the inputted shot information and the inputted shot link information;

channel allocation decision means for referring to the shot link information and deciding to which channel the blocks of images to be reproduced should be allocated;

shot reproduction control means for performing the following:

(a) referring to the shot information, the shot link information, and the channel allocation information;

(b) accessing the image storage means;

(c) simultaneously reproducing blocks of images from the respective FIFO memory units, the blocks of images being reproduced on channels corresponding to the respective channels of the FIFO memory units; and (d) allocating each reproduced block of images in the decided order from a FIFO memory unit corresponding to the decided channel: and effects execution means for linking a number of reproduced blocks images outputted by the shot reproduction control means on a number of channels according to the inputted shot link method and for generating image effects.

\* \* \* \* \*